No. 712,732. Patented Nov. 4, 1902.
M. W. SEITZINGER.
COMBINED DRAW BAR AND SHAFT SUPPORT FOR VEHICLES.
(Application filed May 13, 1902.)
(No Model.) 2 Sheets—Sheet 1.
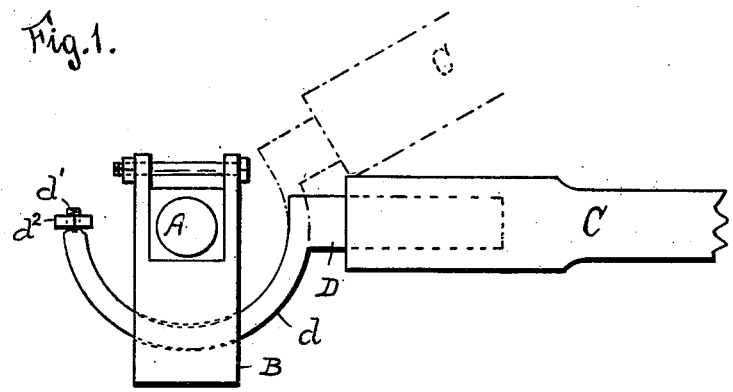
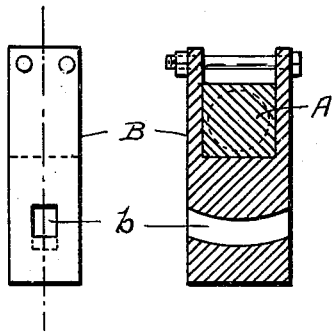
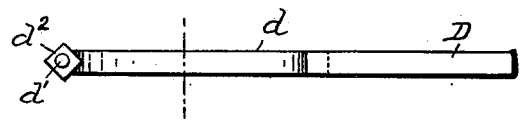
Witnesses
Florence Kelly
Katherine J Kelly
Monroe W. Seitzinger, Inventor
By Attorney No. 712,732. Patented Nov. 4, 1902.
M. W. SEITZINGER.
COMBINED DRAW BAR AND SHAFT SUPPORT FOR VEHICLES.
(Application filed May 13, 1902.)
(No Model.) 2 Sheets—Sheet 2.
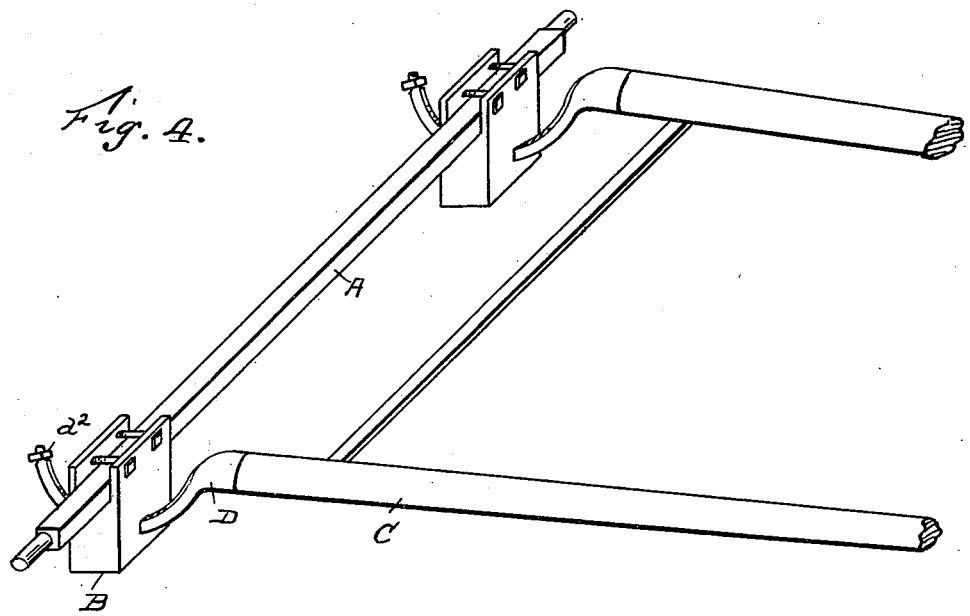

UNITED STATES PATENT OFFICE.

MONROE W. SEITZINGER, OF READING, PENNSYLVANIA.

COMBINED DRAW-BAR AND SHAFT-SUPPORT FOR VEHICLES.

SPECIFICATION forming part of Letters Patent No. 712,732, dated November 4, 1902.

Application filed May 13, 1902. Serial No. 107,065. (No model.)

*To all whom it may concern:*

Be it known that I, MONROE W. SEITZINGER, a citizen of the United States, residing at Reading, in the county of Berks and State of Pennsylvania, have invented certain new and useful Improvements in a Combined Draw-Bar and Shaft-Support; and I do hereby declare the following to be a full, clear, and exact description of the invention, such as will enable others skilled in the art to which it appertains to make and use the same.

This invention relates to improvements in vehicle-shafts; and it consists of a combined draw-bar and support for holding a pair of shafts at any desired height or angle.

The invention consists of hangers secured to the axle of a vehicle and a semicircular member formed on the ends of the shafts adapted to engage said hangers.
The invention is more fully described in the following specification and clearly illustrated in the accompanying drawings, in which—

Figure 1 is a side view of my device. Fig. 2 is a detail view of the hanger. Fig. 3 is a detail view of the shaft-iron. Fig. 4 shows an axletree and a pair of shafts with my device thereon.

A is the axle of a vehicle to which my device is to be applied. B is a hanger, and is secured to said axle by means of bolts passing through its upper ends and over the axle. In the depending portion of said hanger I form a curved opening $b$, extending entirely through it from front to rear.

C is the shaft, to the end of which I secure a shaft-iron D. This iron D is formed with an end $d$, which end is semicircular in form, preferably rectangular in cross-section, and the radius thereof is approximately the same as that of the curved opening $b$ in the hangers B. This curved end $d$ passes through the opening $b$, and its extreme end $d'$ is reduced and screw-threaded, and a nut $d^2$ is screwed thereon after it is in position in the hanger. When in position, as shown in Fig. 1, the shafts may be raised to any desired height or angle to the vehicle, and while the curved end $d$ will move freely in the opening $b$ it will when released bind sufficiently to support the shafts, but with a slight effort may be easily moved in either direction, up or down.

The usefulness of my device is apparent, as is also its simplicity of construction.

Having thus fully described my invention, what I claim, and desire to secure by Letters Patent, is—

The combination with a vehicle-axle, of hangers B secured to said axle by means of bolts passing through their upper ends and over said axle, curved openings formed in said hangers, extending entirely through them, shafts C, irons D on said shafts, formed with semicircular ends the radii of which approximates that of the openings $b$ of the hangers B, screw-threads on the extremities of said curved ends and nuts fitting thereon, said curved ends adapted to fit loosely in said openings $b$, all substantially as and for the purpose set forth.

In testimony whereof I affix my signature in presence of two witnesses.

MONROE W. SEITZINGER.

Witnesses:
 ED. A. KELLY,
 GEO. M. MILLER.